(12) United States Patent
Subrt et al.

(10) Patent No.: US 8,807,261 B2
(45) Date of Patent: Aug. 19, 2014

(54) ARTICULATION CONTROL SYSTEM HAVING STEERING PATH TRACKING

(75) Inventors: Michael C. Subrt, Chillicothe, IL (US); Yongliang Zhu, Dunlap, IL (US); Owen C. Kolstad, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 35 days.

(21) Appl. No.: 13/362,167

(22) Filed: Jan. 31, 2012

(65) Prior Publication Data

US 2013/0192919 A1    Aug. 1, 2013

(51) Int. Cl.
*B60K 17/34*    (2006.01)

(52) U.S. Cl.
USPC .......................................... 180/235; 180/418

(58) Field of Classification Search
USPC .................................. 180/235, 418
See application file for complete search history.

(56) References Cited

U.S. PATENT DOCUMENTS

| 3,688,860 | A | * | 9/1972 | Molby | 180/420 |
| 5,485,893 | A | * | 1/1996 | Summers | 180/219 |
| 5,632,350 | A | | 5/1997 | Gauvin | |
| 5,865,258 | A | * | 2/1999 | McGrew, II | 172/22 |
| 6,460,643 | B1 | * | 10/2002 | Degelman | 180/89.12 |
| 6,854,557 | B1 | | 2/2005 | Deng et al. | |
| 7,006,901 | B2 | * | 2/2006 | Wang | 701/1 |
| RE41,358 | E | * | 5/2010 | Heiniger et al. | 701/23 |
| 8,002,074 | B2 | | 8/2011 | Roose | |
| 8,548,683 | B2 | * | 10/2013 | Cebon et al. | 701/42 |
| 8,639,416 | B2 | * | 1/2014 | Jones et al. | 701/41 |
| 2007/0250236 | A1 | * | 10/2007 | Newberry et al. | 701/51 |
| 2008/0208461 | A1 | * | 8/2008 | Gharsalli et al. | 701/209 |
| 2008/0312792 | A1 | * | 12/2008 | Dechamp | 701/41 |
| 2009/0276127 | A1 | * | 11/2009 | Dix | 701/50 |
| 2010/0049374 | A1 | * | 2/2010 | Ferrin et al. | 701/1 |
| 2010/0222964 | A1 | * | 9/2010 | Dechamp | 701/41 |
| 2011/0035109 | A1 | * | 2/2011 | Ryerson et al. | 701/42 |
| 2012/0283909 | A1 | * | 11/2012 | Dix | 701/41 |
| 2013/0179038 | A1 | * | 7/2013 | Goswami et al. | 701/42 |

FOREIGN PATENT DOCUMENTS

| WO | 95-17328 A1 | 6/1995 |
| WO | 2008-073045 A1 | 6/2008 |

* cited by examiner

*Primary Examiner* — Joseph M Rocca
*Assistant Examiner* — Conan Duda
(74) *Attorney, Agent, or Firm* — Finnegan, Henderson, Farabow, Garrett & Dunner LLP

(57) ABSTRACT

An articulation control system is disclosed for use with a mobile machine having a traction device. The articulation control system may have a speed sensor configured to generate a first signal indicative of a travel speed of the mobile machine, a steering angle sensor configured to generate a second signal indicative of a steering angle of the traction device, and an articulation actuator configured to articulate a front frame of the mobile machine relative to a rear frame of the mobile machine. The articulation control system may also have a controller in communication with the speed sensor, the steering angle sensor, and the articulation actuator. The controller may be configured to track a travel path of the front frame based on the first and second signals, and to regulate operation of the articulation actuator to cause the rear frame to follow the travel path of the front frame.

18 Claims, 4 Drawing Sheets

ARTICULATION CONTROL SYSTEM HAVING STEERING PATH TRACKING

TECHNICAL FIELD

This disclosure relates generally to an articulation control system for a mobile machine and, more particularly, to an articulation control system having steering path tracking.

BACKGROUND

A motor grader is an earth-moving machine generally employed as a finishing tool to sculpt a surface of a construction site or roadway to a desired shape and contour. A typical motor grader includes a front frame and a rear frame that are joined together at an articulation joint. The rear frame supports a power source, which is operatively coupled to rear wheels for primary propulsion of the motor grader. The rear wheels are arranged in tandem axles at opposing sides of the rear frame. The front frame includes a pair of front wheels and supports an operator station and a tool (e.g., a blade). The tool can be rotated, tilted, raised, lowered, and shifted side-to-side to a number of different positions. Steering of the motor grader is a function of both front wheel steering and articulation of the front frame relative to the rear frame. The operator station includes numerous hand controls used to steer the front wheels, position the tool, and control articulation.

Motor graders can be difficult to control effectively and require a highly skilled operator to produce desired surface contours. For example, in cul-de-sac grading, the operator is required to maneuver the motor grader around a substantially circular path while also maintaining the blade at a desired height and at a desired distance from curbs and other obstacles. This requires the operator to simultaneously control the blade, front wheel steering, and articulation. Failure to properly control articulation in such instances can result in the front and rear frames of the machine following separate travel paths, which can cause obstacle collisions or incomplete grading.

One attempt to simplify motor grader control is disclosed in U.S. Patent Publication No. 2011/0035109 of Ryerson et al. ("the '109 publication"). In particular, the '109 publication discloses a steering system with automated articulation control. The steering system includes a steering sensor configured to provide a signal indicative of a steering angle of a first frame, and a controller configured to calculate an articulation angle between the first frame and a second frame as a function of the steering angle such that a turning radius of the second frame matches a turning radius of the first frame.

Although the steering system of the '109 publication may help to simplify motor grader control, the steering system may still be less than optimal. Specifically, because the controller tries to match the turning radius of the first frame with the turning radius of the second frame, inaccuracies in articulation control may occur when steering of the machine transitions between curves having different radiuses (e.g., during machine travel along an S-shaped trajectory).

The disclosed articulation control system is directed to overcoming one or more of the problems set forth above and/or other problems of the prior art.

SUMMARY

In one aspect, the present disclosure is directed to an articulation control system for a mobile machine having a traction device. The articulation control system may include a speed sensor configured to generate a first signal indicative of a travel speed of the mobile machine, a steering angle sensor configured to generate a second signal indicative of a steering angle of the traction device, and an articulation actuator configured to articulate a front frame of the mobile machine relative to a rear frame of the mobile machine. The articulation control system may also include a controller in communication with the speed sensor, the steering angle sensor, and the articulation actuator. The controller may be configured to track a travel path of the front frame based on the first and second signals, and to regulate operation of the articulation actuator to cause the rear frame to follow the travel path of the front frame.

In another aspect, the present disclosure is directed to a method of controlling a mobile machine having a traction device. The method may include detecting a travel speed of the mobile machine and detecting a steering angle of the traction device. The method may also include tracking a travel path of a front frame of the mobile machine based on the travel speed and the steering angle, and articulating the front frame relative to a rear frame of the mobile machine to cause the rear frame to follow the travel path of the front frame.

DETAILED DESCRIPTION

Figure 1:
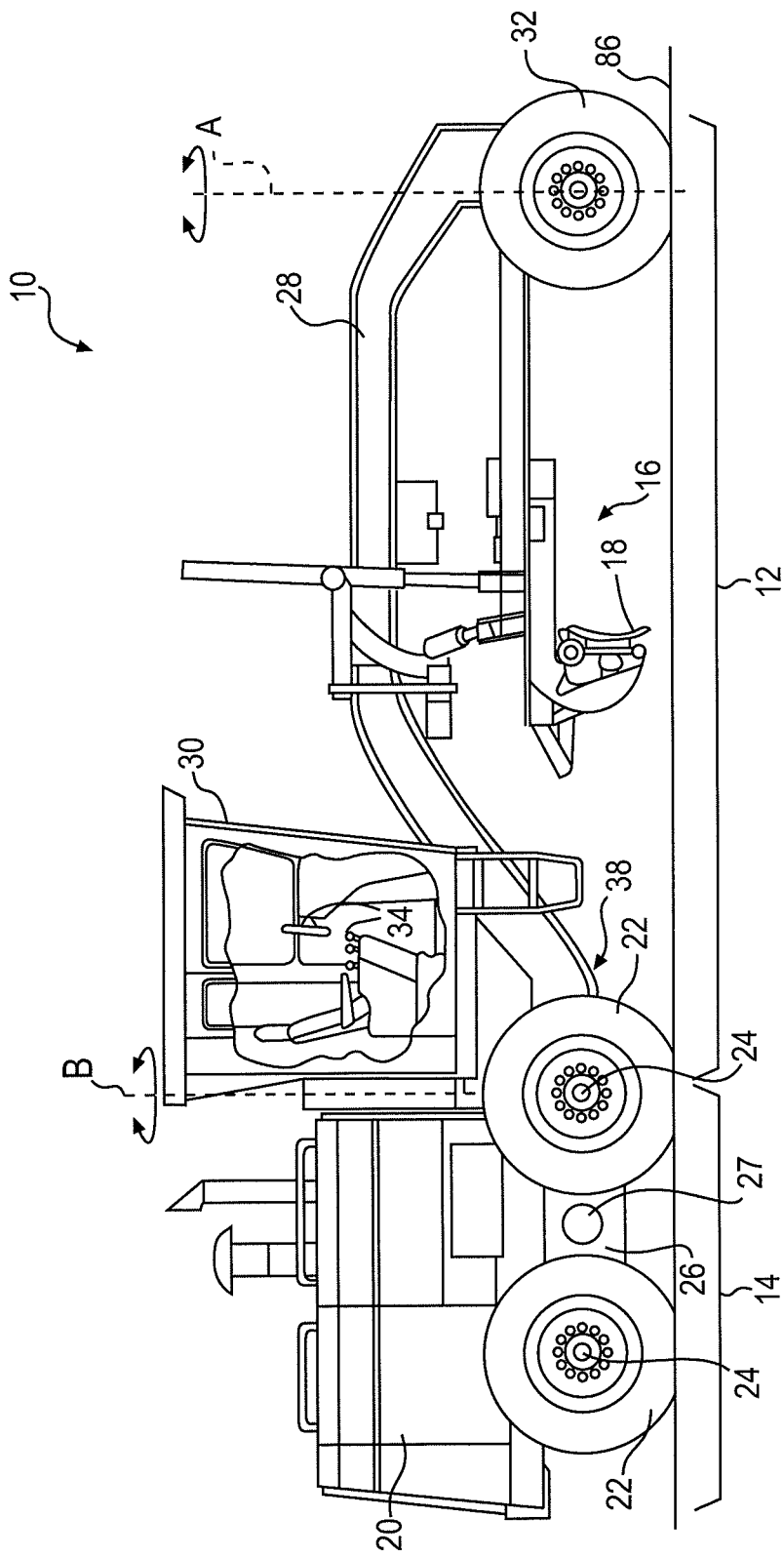
FIG. 1 is a side-view diagrammatic illustration of an exemplary disclosed machine.
Figure 2:
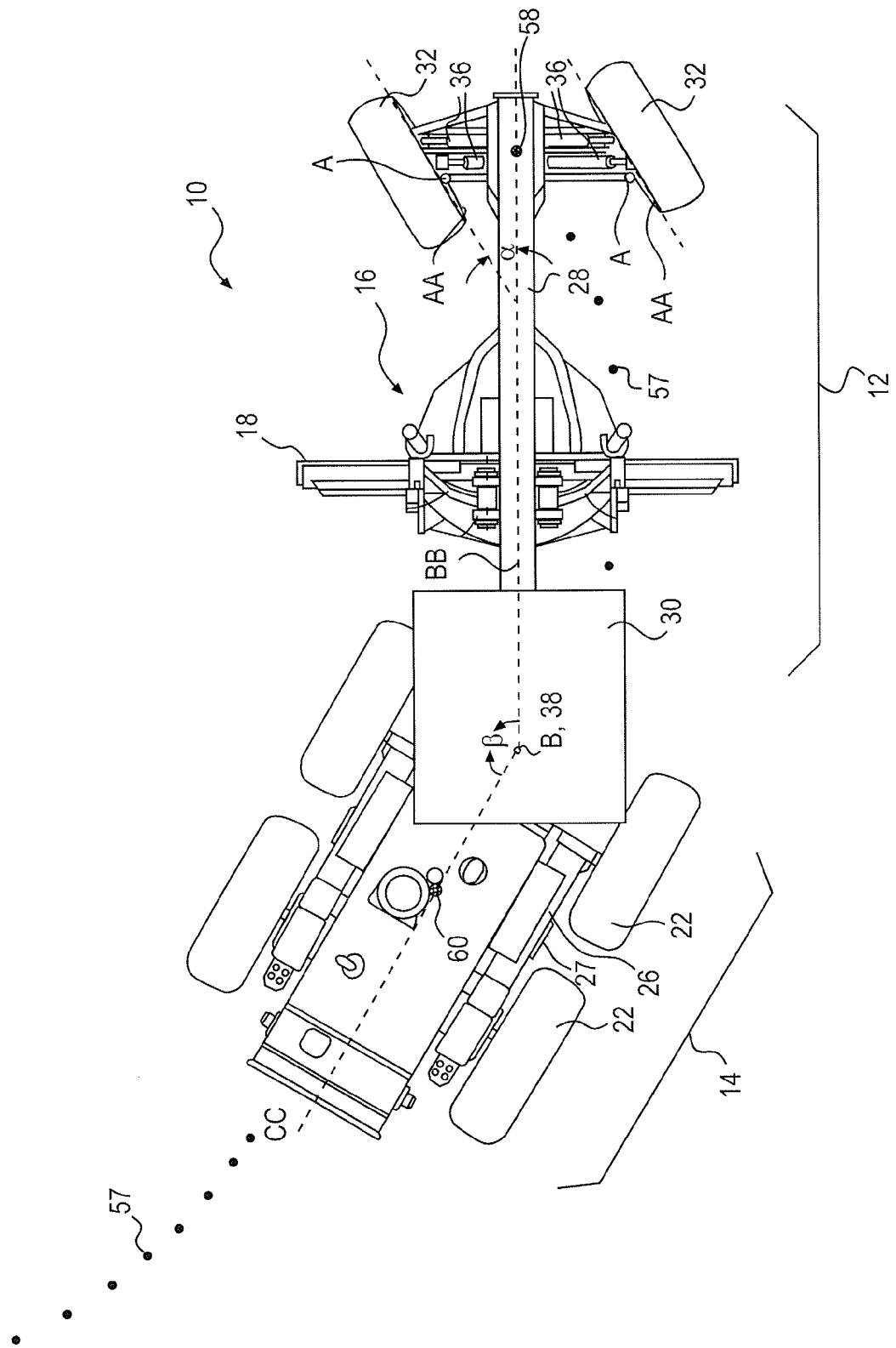
FIG. 2 is a top-view diagrammatic illustration of the machine of FIG. 1.

Referring to FIG. 1 and FIG. 2, there is shown an earth-moving machine 10 in accordance with one embodiment of the present disclosure. Machine 10 is shown in the context of a motor grader having a front frame 12, a rear frame 14, and a work implement 16, that, in the context of a motor grader, typically includes a blade 18. Rear frame 14 may support a power source 20 that is operatively coupled to rear traction devices (e.g., wheels) 22 for primary machine propulsion. Rear traction devices 22 may be located at opposing sides of machine 10 (only one side shown in FIG. 1) and operatively supported on tandem axles 24. In the disclosed embodiment, tandem axles 24 may be connected to each other via a toggle member 26, which is connected to rear frame 14 at a pivot point 27 located between axles 24. Power source 20 may be, for example, a diesel engine, a gasoline engine, a gaseous fuel-powered engine, or another engine known in the art.

Front frame 12 may include a beam 28 that supports blade 18, an operator station 30, and one or more front traction devices (e.g., wheels) 32. Operator station 30 may contain many different interface devices 34 used for primary control of machine 10, along with a variety of displays or indicators used to convey information to the operator. Interface devices 34 may embody, for example, joysticks, steering wheels, buttons, switches, or other devices used to control movement (i.e., pivoting, rotating, curling, sliding, swinging, etc.) of blade 18, steering of front traction devices 32, and articulation of machine 10. As shown in FIGS. 1 and 2, front traction devices 32 may be pivoted about a vertical axis A by way of one or more steering actuators 36. In FIG. 2, front traction devices 32 are positioned at a left-steering angle α, wherein a vertical plane AA of each front traction device 32 is rotated to the left relative to a vertical plane BB of front frame 12. A positive value of α may be indicative of counterclockwise rotation of front traction devices 32, from the perspective of an operator facing forward, while a negative value of α may be indicative of clockwise rotation.

Front frame 12 may be pivotally connected to rear frame 14 by way of an articulation joint 38. One or more hydraulic cylinders 40 (shown only in FIG. 3) may be located on each side of articulation joint 38 and be configured to affect articulation of machine 10 about a vertical axis B. For example, the hydraulic cylinder 40 located on a right side of machine 10 may extend while the hydraulic cylinder 40 located on a left side of machine 10 simultaneously retracts, thereby causing front frame 12 to pivot counterclockwise about axis B relative to rear frame 14. It is contemplated that a different configuration of hydraulic cylinders 40 may be utilized to articulate machine 10, if desired, such as a single hydraulic cylinder 40 located at only one side of machine 10. It is further contemplated that hydraulic cylinders 40 may be replaced with other types of articulation actuators, for example electric or hydraulic motors, if desired. In FIG. 2, machine 10 is positioned at a left-articulation angle β, wherein vertical plane BB of front frame 12 is rotated to the left relative to a vertical plane CC of rear frame 14. A positive value of β may be indicative of counterclockwise pivoting of frame 12, from the perspective of an operator facing forward, while a negative value of β would be indicative of clockwise pivoting.

Figure 3:
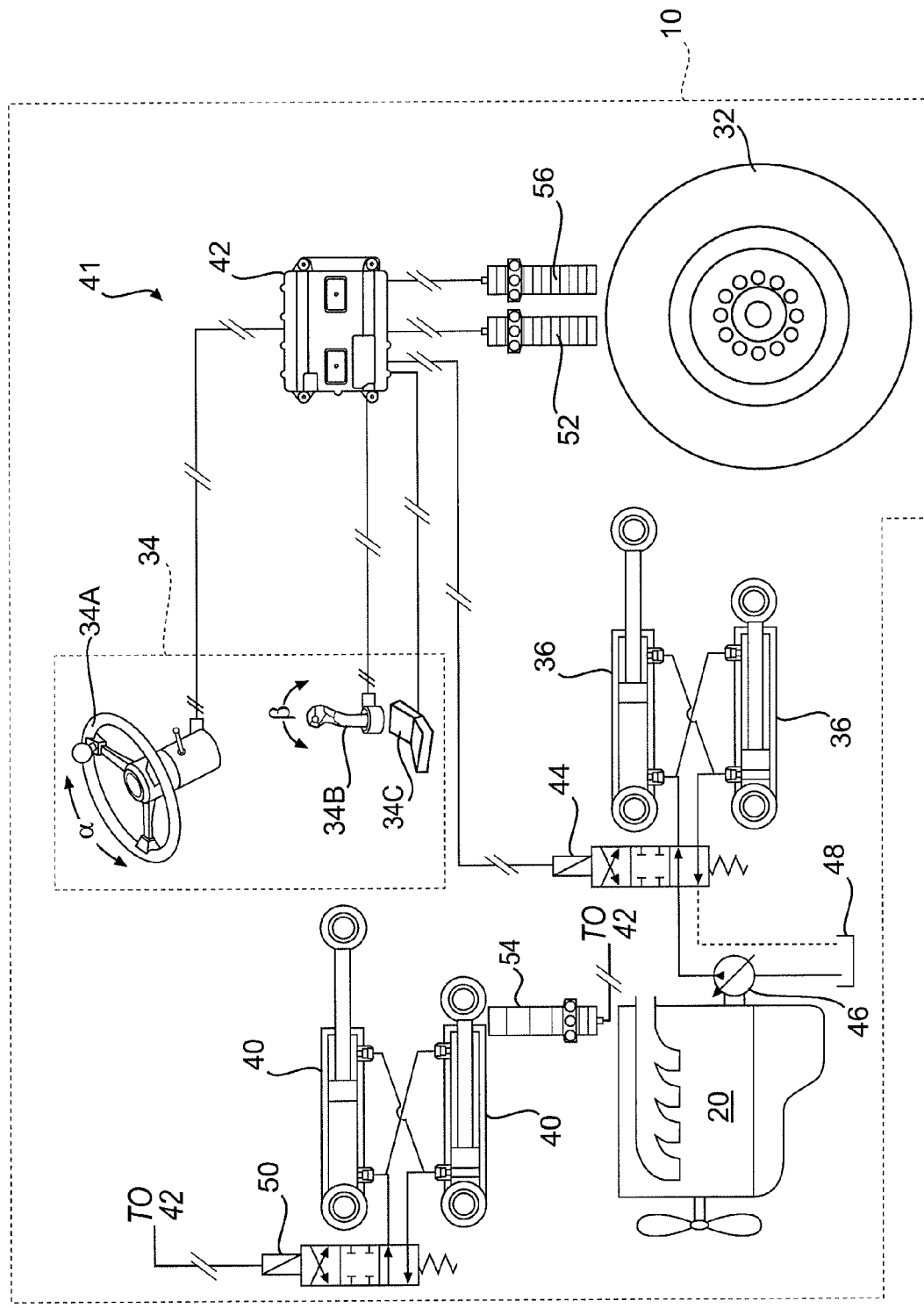
FIG. 3 is a diagrammatic illustration of an exemplary disclosed control system that may be used in conjunction with the machine of FIGS. 1 and 2.

Referring to FIG. 3, maneuvering of machine 10 may be regulated by a control system 41 through a combination of both front wheel steering and machine articulation. Control system 41 may generally include an electronic controller 42 configured, for example, via a control algorithm, to receive a plurality of signals from various sensors and/or interface devices 34, and to responsively provide commands to steering actuators 36 and/or hydraulic cylinders 40 to regulate steering of front traction devices 32 and articulation of front frame 12. Controller 42 may thus include various components for running software applications designed to regulate various subsystems of machine 10. For example, controller 42 may include a central processing unit (CPU), a random access memory (RAM), input/output (I/O) elements, etc.

The sensors that provide signals to controller 42 may include, among others, a steering angle sensor 52, an articulation angle sensor 54, and a travel speed sensor 56. Steering angle sensor 52 may be associated with steering actuators 36 and/or front traction devices 32, and configured to produce a steering angle signal indicative of an actual steering angle of front traction devices 32 (i.e., indicative of a value of steering angle α). Articulation angle sensor 54 may be associated with hydraulic cylinders 40 and/or articulation joint 38, and configured to produce an articulation angle signal indicative of an actual articulation angle of front frame 12 (i.e., indicative of a value of articulation angle β). Travel speed sensor 56 may associated with front traction devices 32 or another drive train component of machine 10, and configured to sense a rotational speed thereof and produce a corresponding speed signal. It is contemplated that travel speed sensor 56 could alternatively embody another type of speed sensor that directly senses or monitors a machine travel speed, if desired, which may or may not be associated with a rotating component. The signals generated by sensors 52-56 may be directed to controller 42 for further processing.

Controller 42 may be in communication with interface devices 34 to receive signals indicative of desired steering and articulation angles. In particular, controller 42 may be in communication with a first interface device 34A, for example a steering wheel, to receive a first signal indicative of a desired steering angle of front traction devices 32 about axis A. Controller 42 may also be in communication with a second interface device 34B, for example a joystick, to receive a second signal indicative of a desired articulation angle of front frame 12 about axis B. Controller 42 may additionally be in communication with a third interface device 34C, for example a switch or a button, to receive a third signal indicative of a desired mode of maneuvering such as a manual mode or an automated mode. The signals generated by interface devices 34 may be directed to controller 42 for further processing.

Controller 42 may be in communication with a control element 44 associated with steering actuators 36 to regulate pivoting of front traction devices 32 in response to the signals received from interface device 34 A. In the disclosed example, control element 44 may be a solenoid-operated fluid valve movable to selectively fluidly communicate a fluid source 46 (e.g., a pump or accumulator) and a tank 48 with different chambers of steering actuators 36, thereby causing steering actuators 36 to extend or retract and pivot front traction devices 32 in a desired direction. The position of control element 44 may correspond with a flow rate of pressurized fluid into and out of steering actuators 36 and a corresponding steering velocity (i.e., the time derivative of steering angle α) of front traction devices 32.

Controller 42 may also be in communication with a control element 50 associated with hydraulic cylinders 40 to regulate articulation of front frame 12 in response to the signals received from interface devices 34 and sensors 52-56. In the disclosed example, control element 50 may be a solenoid-operated fluid valve movable to selectively fluidly communicate source 46 and tank 48 with different chambers of hydraulic cylinders 40, thereby causing hydraulic cylinders 40 to extend or retract and pivot front frame 12 in a desired direction. The position of control element 50 may correspond with a flow rate of pressurized fluid into and out of hydraulic cylinders 40 and a corresponding articulation velocity (i.e., the time derivative of articulation angle β) of front frame 12.

Figure 4:
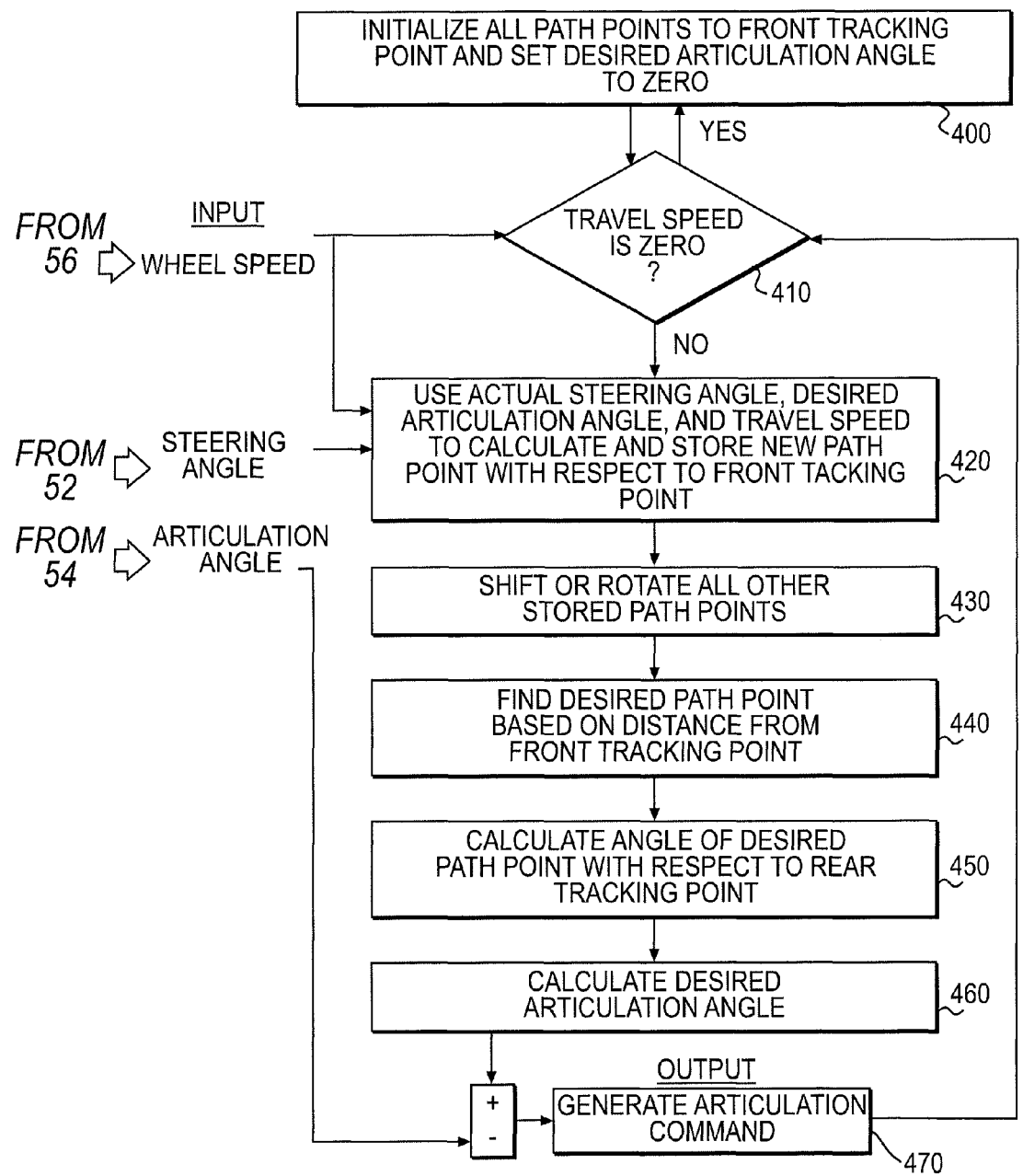
FIG. 4 is a flowchart depicting an exemplary disclosed method that can be performed by the articulation control system of FIG. 3.

FIG. 4 illustrates a method performed by control system 41 when the operator of machine 10 indicates via interface device 34C a desire for automated control over machine maneuvering. In general, during the automated mode of maneuvering, controller 42 may be configured to track a path of front frame 12, for example a path consisting of a plurality of equally-spaced path points 57 (referring to FIG. 1) corresponding to the moving location of front traction devices 32 (i.e., corresponding to the moving location of a front tracking point 58 positioned about equidistant between front traction devices 32 that is substantially aligned with vertical plane BB), and automatically articulate front frame 12 to cause rear traction devices 22 (i.e., to cause a rear tracking point 60 positioned about equidistant between rear traction devices 22 and aligned with vertical plane CC and pivot point 27) to follow the tracked path of front frame 12. FIG. 4 will be described in more detail below to further illustrate the disclosed concepts.

INDUSTRIAL APPLICABILITY

The control system of the present disclosure may generally be applicable to any articulated machine having front steering. The system has particular application for earth-moving machines such as motor graders, wherein the operator needs to closely control a variety of complex machine functions (e.g., tool functions) while simultaneously maneuvering the machine in a curved trajectory (e.g., during cul-de-sac contouring). The disclosed system may receive manual steering commands from the operator and, based upon the manual steering commands and various sensory input, automatically control machine articulation so that rear traction devices of the machine follow in the same travel path taken by front traction devices of the machine. Operation of control system 41, during the automated mode, will now be described in detail.

With reference to FIG. 4, during the automated mode of maneuvering, control may begin with initialization of all travel path points 57 in memory to the current location of front traction devices 32 (i.e., to the current position of front tracking point 58 associated with front traction devices 32) and the setting of a desired articulation angle to zero (Step 400). Controller 42 may then compare the current travel speed of machine 10 (as provided by travel speed sensor 56) to a threshold speed (Step 410). In the disclosed embodiment, the threshold speed is zero, although any threshold speed may be utilized. If the current travel speed is non-zero (i.e., if machine 10 is moving), control may continue to the next step. Otherwise, control may return and cycle through step 400 until machine 10 begins to move.

Controller 42 may periodically calculate and store a new path point 57 corresponding to the travel path taken by front traction devices 32 as a function of the actual steering angle α (as provided by steering angle sensor 52), the desired articulation angle, and the current travel speed of machine 10 (Step 420). In one embodiment, controller 42 may calculate and store a new path point 57 about every 20 milliseconds, although other time intervals may also be utilized, if desired. Any function(s) known in the art may be utilized by controller 42 to calculate the new path point 57. In one embodiment, the new path point 57 may simply be calculated as a distance traveled since calculation of a previous path point 57, the distance being determined based directly on a travel speed of machine 10 and the time interval between generation of sequential path points 57. This distance may then simply be added as an offset to the previous path point 57 to generate the new path point 57. If, however, the actual steering angle is non-zero during this travel, the new path point 57 may be determined as both a distance offset and a rotation change in a corresponding horizontal direction relative to the previous path point 57.

Based on the location of the new path point 57, controller 42 may then shift and/or rotate relative to a machine reference frame all other path points 57 that have been previously calculated and stored in memory (Step 430). That is, based on a distance between the newly created path point 57 and the path point 57 previously stored in memory, controller 42 may shift all stored path points 57 by the same distance. Similarly, based on an orientation of the newly created path point 57 relative to the previously stored path point 57, controller 42 may rotate all stored path points 57 by the same angle. For example, given a first path point 57 calculated to have a location of (X1, Y1) relative to the machine frame of reference at a time $T_x$, a new path point 57 generated at a time $T_{x+20\,ms}$ might have a location of (X2, Y2). After movement of machine 10 to and calculation of the new path point 57, the previously stored path point 57 will no longer be at (X1, Y1) relative to the machine frame of reference. Instead, the previously stored path point 57 will have shifted and/or rotated relative to the machine frame of reference by an amount equal to (X2−X1, Y2−Y1). Accordingly, controller 42 may shift and/or rotate stored path points 57 based on the location of the new path point 57 each time a new path point 57 is calculated. In this manner, controller 42 may maintain all path points 57 stored in memory at current locations relative to the machine frame of reference that is constantly changing during machine travel. Any technique(s) known in the art may be utilized to shift and rotate the stored path points 57 based on the location of the new path point 57.

Controller 42 may then select, from among the stored path points 57, the single path 57 point that should be utilized to control current articulation of machine 10 such that rear traction devices 22 will follow the same travel path taken by front traction devices 32 (Step 440). In the disclosed embodiment, the single path point 57 may be selected by controller 42 based on a distance rearward from front traction devices 32. The closer the desired path point 57 is to rear tracking point 60, the more accurately controller 42 may cause rear traction devices 22 to follow in the same travel path as front traction devices 32. However, the further that the desired path point 57 is away from rear tracking point 60, the more stable machine maneuvering may be. In the disclosed embodiment, controller 42 may select from memory the single path point 57 that is located at about 90-95% of a distance rearward from front traction devices 32 to rear tracking point 60 to provide for both accurate and stable machine maneuvering. This distance may also correspond with a location about 12-15% of a distance rearward from vertical axis B to rear tracking point 60.

Once the desired path point 57 has been selected as the single path point 57 that should be used for control of machine articulation, controller 42 may calculate an angle between the desired path point 57 and vertical plane CC, with respect to rear tracking point 60 (Step 450). This angle may be calculated as a function of the relative positions between the desired path point 57 and rear tracking point 60, as is known in the art. Based on the angle between the desired path point 57 and the rear tracking point 60, controller 42 may then determine the desired articulation angle of front frame 12 relative to rear frame 14 that, in combination with the current steering angle of machine 10, should cause rear tracking point 60 to pass through the desired path point 57 along the trajectory previously passed through by front tracking point 58 (Step 460). The desired articulation angle may be calculated using any conventional method(s). Controller 42 may then automatically generate an articulation command directed to control element 50 as a function of the current articulation angle β (as provided by articulation angle sensor 54) and the desired articulation angle (Step 470). Control may then cycle back to step 410.

Controller 42 may exit the automated mode of maneuvering at any time based either on manual input or based on signals from sensors 52-56. For example, controller 42 may exit the automated mode of operation based on input received from the operator via interface devices 34 (e.g., when the operator moves interface device 34B to manually adjust articulation and/or when the operator depresses interface device 34C to signal a desire to exit the automated mode). Controller 42 may also exit the automated mode when signals from any one or more of sensors 52-56 indicate at least one of the travel speed, the actual steering angle, and the actual articulation angle deviating from an acceptable range. It is also contemplated that, in some embodiments, automated control over articulation may continue when a steering angle and/or an articulation angle deviates from the acceptable range, if desired, although accuracy of travel path tracking may have a reduced accuracy in this situation. For example, machine 10 may only be capable of articulating through a maximum angle β of +/−20 degrees and, in some situations, this may be insufficient to accurately cause rear traction devices 22 to track front traction devices 32.

Control system 41 may also be capable of functioning in reverse direction, if desired. In particular, during reverse travel of machine 10, controller 42 may be configured to track a travel path of rear tracking point 60 and, based on an articulation input from the operator, automatically control steering such that front tracking point 58 follows the travel path. When switching from forward to reverse travel, it may be possible to retain in memory and reuse the same path points, if desired.

Control system 41 may regulate articulation of machine 10 with high accuracy during the automated mode of maneuvering. In particular, because control system 41 may track path points previously taken by front frame 12 and then control rear frame 14 to pass through those same points, it may be more likely that rear traction devices 22 follows in a more accurate manner the same travel path taken by front traction devices 32 (i.e., the same travel path within an acceptable tolerance), regardless of how the curvature of the travel path changes. This accuracy may enhance control of machine 10, requiring fewer manual corrections and/or improving the resulting contours created by machine 10.

It will be apparent to those skilled in the art that various modifications and variations can be made to the disclosed control system without departing from the scope of the disclosure. Other embodiments of the control system will be apparent to those skilled in the art from consideration of the specification and practice of the steering control system disclosed herein. It is intended that the specification and examples be considered as exemplary only, with a true scope being indicated by the following claims and their equivalents.

What is claimed is:

1. An articulation control system for a mobile machine having a traction device, the articulation control system comprising:
   a speed sensor configured to generate a first signal indicative of a travel speed of the mobile machine;
   a steering angle sensor configured to generate a second signal indicative of a steering angle of the traction device;
   an articulation actuator configured to articulate a front frame of the mobile machine relative to a rear frame of the mobile machine; and
   a controller in communication with the speed sensor, the steering angle sensor, and the articulation actuator, the controller being configured to:
   calculate and store a travel path corresponding to a moving location of the front frame based on the first and second signals, the travel path including a plurality of discrete sequential points;
   select one of the discrete sequential points of the travel path as a desired path point; and
   regulate operation of the articulation actuator, based at least on a location of the desired path point of the calculated and stored travel path, to cause the rear frame to follow the travel path of the front frame.

2. The articulation control system of claim 1, wherein the controller is configured to calculate the discrete sequential points of the travel path at equally timed intervals.

3. The articulation control system of claim 2, wherein the discrete sequential points are spaced apart by about 20 milliseconds.

4. The articulation control system of claim 1, wherein:
   the traction device is one of a pair of front traction devices supported at opposing ends of a front axle; and
   the travel path of the front frame corresponds with a travel path of a point on the front axle located about equidistant between the front traction devices.

5. The articulation control system of claim 4, wherein:
   the rear frame includes tandem axles supporting opposing rear traction devices; and
   the controller is configured to regulate operation of the articulation actuator to cause a point located about equidistant between the tandem axles and about equidistant between the opposing rear traction devices to follow the travel path of the front frame.

6. The articulation control system of claim 1, further including an articulation angle sensor configured to generate a third signal indicative of an articulation angle of the front frame relative to the rear frame, wherein the travel path of the front frame is tracked based further on the third signal.

7. The articulation control system of claim 6, wherein the controller is configured to regulate operation of the articulation actuator based on the travel path of the front frame and on the third signal.

8. The articulation control system of claim 1, wherein the controller is configured to
   selectively shift and rotate the discrete sequential points of the travel path relative to a machine frame of reference as the mobile machine moves.

9. The articulation control system of claim 1, wherein the desired path point is at a location between a front axle of the mobile machine and a position about midway between rear tandem axles of the mobile machine.

10. The articulation control system of claim 9, wherein the location is about 90-95% of a distance from a center of the front axle to the position about midway between the rear tandem axles.

11. The articulation control system of claim 1, further including a mode selector configured to indicate operator selection of an automated articulation control mode and a manual articulation control mode, wherein the controller is in communication with the mode selector and configured to automatically calculate and store the travel path of the front frame and automatically regulate operation of the articulation actuator only when the mode selector indicates that the automated articulation control mode has been selected by an operator of the mobile machine.

12. The articulation control system of claim 11, wherein the controller is further configured to exit the automated articulation control mode when at least one of the travel speed, the steering angle, and an articulation angle of the mobile machine deviates from an acceptable range.

13. A method of controlling articulation of a mobile machine having a traction device, the method comprising:
   detecting a travel speed of the mobile machine;
   detecting a steering angle of the traction device;
   calculating and storing a travel path corresponding to a moving location of a front frame of the mobile machine based on the travel speed and the steering angle, the travel path including discrete sequential points;
   selecting one of the discrete sequential points of the travel path as a desired path point; and
   articulating the front frame relative to a rear frame of the mobile machine, based at least on a location of the desired path point of the calculated and stored travel path, to cause the rear frame to follow the travel path of the front frame.

14. The method of claim 13, wherein calculating the travel path of the front frame includes calculating the discrete sequential points of the travel path at equally timed intervals.

15. The method of claim 14, further including selectively shifting and rotating the discrete sequential points of the travel path relative to a machine frame of reference as the mobile machine moves.

16. The method of claim 13, wherein:
   the traction device is one of a pair of front traction devices supported at opposing ends of a front axle;

the travel path of the front frame corresponds with a travel path of a point on the front axle located about equidistant between the front traction devices;

the rear frame includes tandem axles supporting opposing rear traction devices; and articulating the front frame relative to the rear frame of the mobile machine to cause the rear frame to follow the travel path of the front frame includes articulating the front frame to cause a point located about equidistant between the tandem axles and about equidistant between the opposing rear traction devices to follow the travel path of the front frame.

17. The method of claim 13, further including:

receiving an operator selection of an automated articulation control mode and a manual articulation control mode, wherein the method includes articulating the front frame relative to a rear frame of the mobile machine to cause the rear frame to follow the travel path of the front frame only when the operator selection is the automated articulation control mode; and exiting the automated articulation control mode when at least one of the travel speed, the steering angle, and an articulation angle of the mobile machine deviates from an acceptable range.

18. An articulated machine, comprising:

a front axle connecting opposing front traction devices;

a front frame supported by the front axle;

an operator station mounted to the front frame;

tandem rear axles each supporting opposing rear traction devices;

a rear frame supported by the tandem rear axles;

an engine mounted to the rear frame and configured to drive the rear traction devices;

an articulation joint pivotally connecting the front and rear frames;

an articulation actuator configured pivot the front frame relative to the rear frame about the articulation joint;

a speed sensor configured to generate a first signal indicative of a travel speed of the articulated machine;

a steering angle sensor configured to generate a second signal indicative of a steering angle of the front traction devices;

an articulation sensor configured to generate a third signal indicative of an actual articulation angle of the front frame relative to the rear frame; and a controller in communication with the articulation actuator, the speed sensor, the steering sensor, and the articulation sensor, the controller being configured to:

calculate and store a travel path corresponding to a moving location of the front frame based on the first, second, and third signals, the travel path including a plurality of discrete sequential path points;

select, from the plurality of discrete sequential path points, a desired path point for use in controlling articulation of the machine;

determine a desired articulation angle, based at least on the desired path point, that should cause the rear frame to follow the travel path of the front frame; and regulate operation of the articulation actuator based on the desired and actual articulation angles.

* * * * *